UNITED STATES PATENT OFFICE.

HERBERT ABRAHAM, OF BOUNDBROOK, NEW JERSEY, ASSIGNOR TO THE STANDARD PAINT COMPANY, OF BOUNDBROOK, NEW JERSEY, A CORPORATION OF WEST VIRGINIA.

LIQUID CEMENTING-PAINT.

No. 824,898.     Specification of Letters Patent.     Patented July 3, 1906.

Application filed March 31, 1905. Serial No. 263,140.

*To all whom it may concern:*

Be it known that I, HERBERT ABRAHAM, a citizen of the United States, and a resident of Boundbrook, in the county of Somerset, State of New Jersey, have invented certain new and useful Improvements in Liquid Cementing-Paints, of which the following is a specification.

My invention relates to liquid paints adapted for use as cements to join the seams of roofing and like material or for painting flexible coverings containing bitumens, pitches, or other ingredients of a plastic nature.

The object of my invention is to produce a permanent weatherproof paint of the above-indicated character, which will stick to the roofing or like foundation without cracking under the influence of temperature changes or when the foundation is rolled and unrolled and the ingredients of which will have no injurious action upon each other or upon the foundation and will not themselves be detrimentally affected by the foundation.

My improved paint comprises three ingredients—to wit, first, a body or binder; second, a pigment, and, third, a more or less volatile solvent.

I have found that in order to satisfy the requirements of my invention the binder or body should consist of a substance or a mixture of substances fulfilling the following conditions: first, it must be plastic, so as to yield a flexible coating upon evaporation of the solvent; second, it must successfully withstand the oxidizing and disintegrating effects of the atmosphere; third, it must possess a color sufficiently light, so as not to mask that of the pigments employed either when first made up into the paint or on being kept thus for a long time; fourth, it must not yield gelatinous solutions with solvents when both are present in approximately equal quantities and when the mixture or solution is kept in closed cans for lengthy periods. For practical purposes of course it is further required that the substances used should not be too expensive.

All pitches which comply with the requirements above indicated may be successfully employed in the manufacture of my improved paints. These pitches all possess the characteristic of being transparent, translucent, or semitransparent and of a light yellowish or brownish color when viewed in thin layers.

As regards pigments, I may say that metallic oxids are recommended on account of their permanence and inertness. It will be understood that no pigment should be employed which would enter into harmful reaction either with the other ingredients of the paint or with those of the foundation. When employing metallic oxids as pigments, they should be used in an extremely-fine state of subdivision, such as is obtained by air or water floating, thus dispensing with a grinding operation. It has been found that grinding the pigment when mixed with the binder and the solvent is not a satisfactory procedure on account of the loss of solvent by evaporation and the liability of the paint to gum up the mill.

As solvents I may employ various substances, and I have found the lighter fractions of petroleum, coal-tar, and wood-tar distillates particularly suitable for dissolving the pitches of the character above indicated. Great care should be used to prevent the gelatinization. For this purpose one should avoid the use of pitches of animal or vegetable origin which have been distilled too far, since they lack sufficient plasticity, possess an extremely-dark color due to excessive carbonization, and are apt to gelatinize after they have been dissolved. This gelatinization sometimes occurs immediately after the cooling of the solution, but may even take place after the solution has been kept for some time. Medium and soft pitches when not of a tough rubber-like consistency will permanently remain in the form of a limpid solution. The nature of the solvent employed likewise influences the behavior of the solution to some extent, and gelatinization is less apt to occur with the use of coal-tar distillates than with petroleum products.

The binder or body should of course not be too dark, since otherwise it will mask the pigment, whereas the object of my invention is to provide a body the color of which will be obliterated or at least dominated by that of the pigment.

The process of manufacturing the paint is extremely simple, and consists in first dissolving the pitch in one of the stated solvents by means of a steam-jacketed digester provided with a mechanical stirring device. After complete solution has been effected the paint is allowed to cool, the pigment is incorporated, and the paint drawn off.

The colored preparation is particularly designed for cementing the seams of colored roofing; but it may likewise be used with equal facility to impart color to any variety of black roofings—such as coal-tar, asphalt, &c.—or for recoating colored roofings. A liberal coat will last several years, and although a slight oxidation will occur, particularly when first exposed to the weather, it will remain plastic and be unaffected by the continual expansion and contraction of the foundation. In this respect it differs from all other paints.

The addition of materials other than those mentioned is permissible, provided the plasticity and weather-resisting qualities of the coating are not affected. Thus the use of a small percentage of a resinous substance may serve to bring out the color of the pigments with greater intensity and prevent gelatinization, although a preponderance of such substance would prove highly injurious to the coating. I may also add a dark pitch to the body or binder herein described, provided the percentage of such addition is not high enough to mask the color of the pigment.

To give an example, I will describe the production of a red paint as follows: Thirty parts, by weight, of stearin-pitch of the proper consistency are dissolved in forty parts, by weight, of spirits of turpentine in a steam-jacketed digester at a temperature of about 125° centigrade. When dissolved, the liquid is allowed to cool, and thirty parts, by weight, of a floated ninety-eight-per-cent. red iron oxid stirred in until the mixture becomes homogeneous.

I have found that all cementing-paints made in accordance with this invention exhibit the property of causing the pigment to become more intense after a brief exposure to atmospheric influences.

I claim as my invention—

1. The herein-described process of manufacturing liquid cementing-paint, which consists in dissolving in a volatile solvent, under the application of heat, a weatherproof plastic pitch of a color adapted to be dominated by that of an added pigment, allowing the solution to cool, and then adding a pigment which is relatively inert to the other ingredients.

2. The herein-described process of manufacturing liquid cementing-paint, which consists in dissolving in a volatile solvent, a weatherproof and non-gelatinizing plastic pitch of a color adapted to be dominated by that of an added pigment, and incorporating an inner pigment with the solution.

3. The herein-described process of manufacturing liquid cementing-paint, which consists in incorporating or mixing with each other, a volatile solvent, a weatherproof plastic pitch of a color adapted to be dominated by that of an added pigment, and a pigment which is relatively inert to the other ingredients.

4. A liquid adapted for use as a paint, cement or the like, the said liquid containing a volatile solvent, a weatherproof and non-gelatinizing plastic pitch, and an inert pigment, the color of which dominates that of said pitch.

5. A liquid adapted for use as a paint, cement or the like, the said liquid containing a volatile solvent, a weatherproof plastic binder which contains a weatherproof pitch which appears light-colored and more or less pervious to light when viewed in a thin layer, and a pigment the color of which dominates that of said binder.

6. A liquid adapted for use as a paint, cement or the like, the said liquid containing, as a solvent, one of the lighter hydrocarbon distillates; as a binder, a weatherproof pitch which appears light-colored and more or less pervious to light when viewed in a thin layer; and as a pigment, a metallic oxid the color of which dominates that of the pitch.

In testimony whereof I have hereunto set my hand in the presence of two subscribing witnesses.

HERBERT ABRAHAM.

Witnesses:
JOHN LOTKA,
EUGENE EBLE.

---

It is hereby certified that in Letters Patent No. 824,898, granted July 3, 1906, upon the application of Herbert Abraham, of Boundbrook, New Jersey, for an improvement in "Liquid Cementing-Paints," an error appears in the printed specification requiring correction, as follows: In line 65, page 2, the word "inner" should read *inert;* and that the said Letters Patent should be read with this correction therein that the same may conform to the record of the case in the Patent Office.

Signed and sealed this 7th day of August, A. D., 1906.

[SEAL.]

E. B. MOORE,
*Acting Commissioner of Patents.* means of a steam-jacketed digester provided with a mechanical stirring device. After complete solution has been effected the paint is allowed to cool, the pigment is incorporated, and the paint drawn off.

The colored preparation is particularly designed for cementing the seams of colored roofing; but it may likewise be used with equal facility to impart color to any variety of black roofings—such as coal-tar, asphalt, &c.—or for recoating colored roofings. A liberal coat will last several years, and although a slight oxidation will occur, particularly when first exposed to the weather, it will remain plastic and be unaffected by the continual expansion and contraction of the foundation. In this respect it differs from all other paints.

The addition of materials other than those mentioned is permissible, provided the plasticity and weather-resisting qualities of the coating are not affected. Thus the use of a small percentage of a resinous substance may serve to bring out the color of the pigments with greater intensity and prevent gelatinization, although a preponderance of such substance would prove highly injurious to the coating. I may also add a dark pitch to the body or binder herein described, provided the percentage of such addition is not high enough to mask the color of the pigment.

To give an example, I will describe the production of a red paint as follows: Thirty parts, by weight, of stearin-pitch of the proper consistency are dissolved in forty parts, by weight, of spirits of turpentine in a steam-jacketed digester at a temperature of about 125° centigrade. When dissolved, the liquid is allowed to cool, and thirty parts, by weight, of a floated ninety-eight-per-cent. red iron oxid stirred in until the mixture becomes homogeneous.

I have found that all cementing-paints made in accordance with this invention exhibit the property of causing the pigment to become more intense after a brief exposure to atmospheric influences.

I claim as my invention—

1. The herein-described process of manufacturing liquid cementing-paint, which consists in dissolving in a volatile solvent, under the application of heat, a weatherproof plastic pitch of a color adapted to be dominated by that of an added pigment, allowing the solution to cool, and then adding a pigment which is relatively inert to the other ingredients.

2. The herein-described process of manufacturing liquid cementing-paint, which consists in dissolving in a volatile solvent, a weatherproof and non-gelatinizing plastic pitch of a color adapted to be dominated by that of an added pigment, and incorporating an inner pigment with the solution.

3. The herein-described process of manufacturing liquid cementing-paint, which consists in incorporating or mixing with each other, a volatile solvent, a weatherproof plastic pitch of a color adapted to be dominated by that of an added pigment, and a pigment which is relatively inert to the other ingredients.

4. A liquid adapted for use as a paint, cement or the like, the said liquid containing a volatile solvent, a weatherproof and non-gelatinizing plastic pitch, and an inert pigment, the color of which dominates that of said pitch.

5. A liquid adapted for use as a paint, cement or the like, the said liquid containing a volatile solvent, a weatherproof plastic binder which contains a weatherproof pitch which appears light-colored and more or less pervious to light when viewed in a thin layer, and a pigment the color of which dominates that of said binder.

6. A liquid adapted for use as a paint, cement or the like, the said liquid containing, as a solvent, one of the lighter hydrocarbon distillates; as a binder, a weatherproof pitch which appears light-colored and more or less pervious to light when viewed in a thin layer; and as a pigment, a metallic oxid the color of which dominates that of the pitch.

In testimony whereof I have hereunto set my hand in the presence of two subscribing witnesses.

HERBERT ABRAHAM.

Witnesses:
JOHN LOTKA,
EUGENE EBLE.

---

It is hereby certified that in Letters Patent No. 824,898, granted July 3, 1906, upon the application of Herbert Abraham, of Boundbrook, New Jersey, for an improvement in "Liquid Cementing-Paints," an error appears in the printed specification requiring correction, as follows: In line 65, page 2, the word "inner" should read *inert;* and that the said Letters Patent should be read with this correction therein that the same may conform to the record of the case in the Patent Office.

Signed and sealed this 7th day of August, A. D., 1906.

[SEAL.]

E. B. MOORE,
*Acting Commissioner of Patents.*

It is hereby certified that in Letters Patent No. 824,898, granted July 3, 1906, upon the application of Herbert Abraham, of Boundbrook, New Jersey, for an improvement in "Liquid Cementing-Paints," an error appears in the printed specification requiring correction, as follows: In line 65, page 2, the word "inner" should read *inert;* and that the said Letters Patent should be read with this correction therein that the same may conform to the record of the case in the Patent Office.

Signed and sealed this 7th day of August, A. D., 1906.

[SEAL.]

E. B. MOORE,
*Acting Commissioner of Patents.*